March 19, 1946.    C. H. JACOBSON    2,397,010
CUT FILM HOLDER
Filed June 14, 1944    2 Sheets-Sheet 1
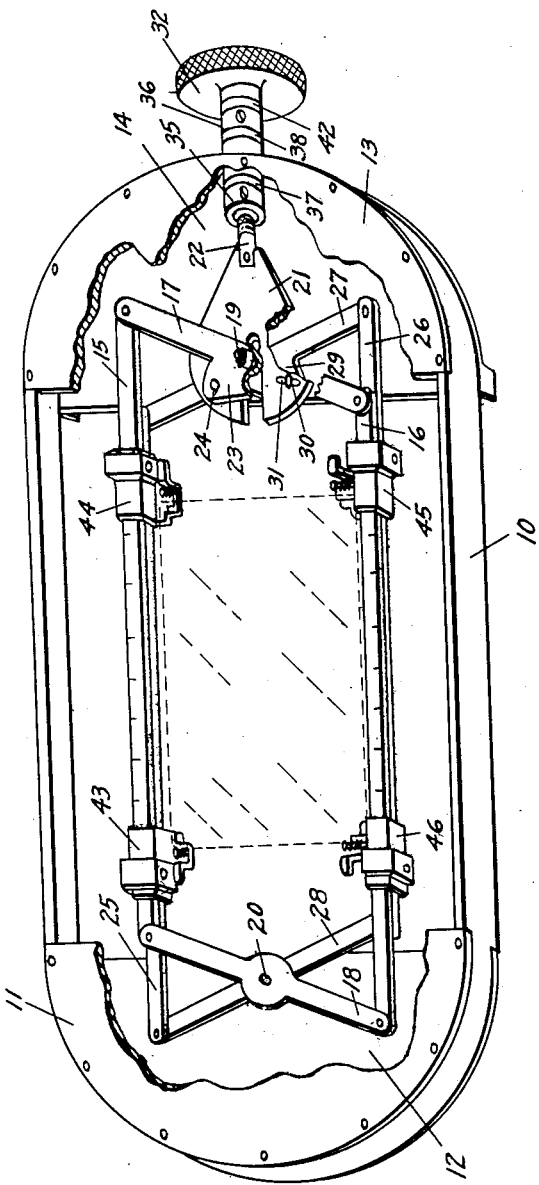
Fig. 1.
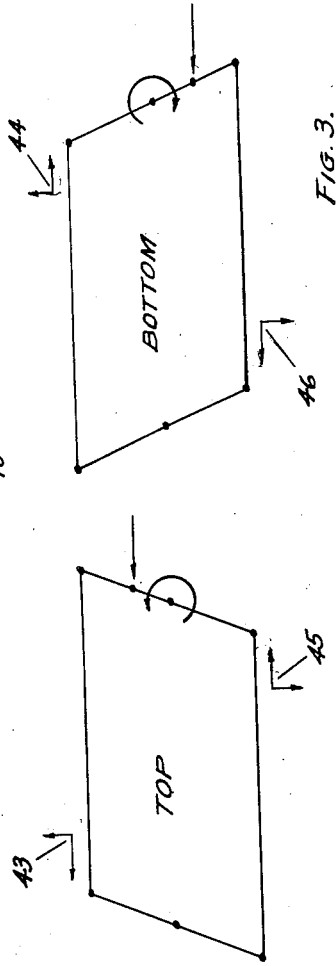
Fig. 2.
Fig. 3.
INVENTOR.
Carl H. Jacobson.
BY
Rodney C. Southworth
ATTORNEYS.

March 19, 1946.  C. H. JACOBSON  2,397,010
CUT FILM HOLDER
Filed June 14, 1944  2 Sheets-Sheet 2

INVENTOR.
Carl H. Jacobson.
BY
Rodney C. Sauthworth
ATTORNEYS.

Patented Mar. 19, 1946

2,397,010

UNITED STATES PATENT OFFICE 2,397,010

CUT FILM HOLDER

Carl H. Jacobson, Binghamton, N. Y., assignor to General Aniline & Film Corporation, New York, N. Y., a corporation of Delaware Application June 14, 1944, Serial No. 540,271

8 Claims. (Cl. 95—100)

This case pertains to an invention in negative or film holders such as are used in photographic work. One typical example of a use for such a holder is evident in projection type printers or enlargers. There the negative is frequently held by inserting the same in a holder which includes glass plates between which it is sandwiched. Such construction is open to objections since the glass plates frequently gather lint, dirt or fingerprints which appear greatly enlarged in the print. That is especially true if the scale of enlargement tends to be more or less extreme. Another common difficulty experienced in printing negatives held between plates is that of interference with the light rays which gives rise to the well known Newton's rings.

In an attempt to avoid the above mentioned difficulties, negative holders have been developed for handling the negative without physical contact other than at the edges or corners of the same. The present invention pertains to such a holder and offers many advantages not to be found in those heretofore known. The construction is relatively simple, inexpensive, and is adapted to tension the negative sufficiently for the purpose of maintaining it in a flattened condition. By a single adjusting means, the tension is applied more or less universally, that is, the negative is gripped at the corners and is pulled in a longitudinal and also in a lateral direction, that being accomplished by a simple parallelogram device controlled by a single tensioning means and adapted to apply the component forces simultaneously.

One common objection to negative holders which grip the negative and apply tensioning forces thereto is that the forces may easily be enough to tear or otherwise damage the negative. Accordingly, it is one of the principal objects of the instant invention to make it impossible to apply more force than is necessary for extending the negative into a plane, and especially, to make it impossible to apply force to that extent likely to tear or otherwise damage it.

The invention will be described by reference to a preferred embodiment of the same illustrated in the accompanying figures of drawing in which:

Fig. 1 is an isometric view, certain parts being broken away, which shows the holder with a film in place.

Fig. 2 is a diagrammatic representation of the top parallelogram mechanism, showing the direction of movement, and forces resulting therefrom.

Fig. 3 is a view similar to Fig. 2, but applicable to the bottom parallelogram.

Figure 4:
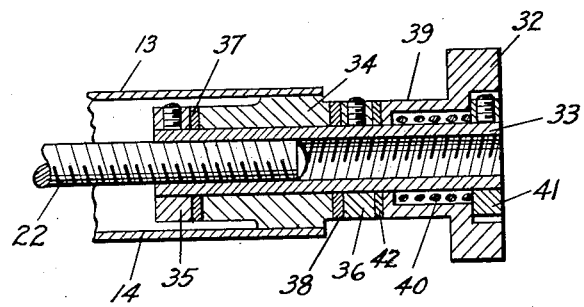
Fig. 4 is a sectional view, to an enlarged scale, and showing the friction film tensioning control.

Now referring to Fig. 1, the negative holder includes, among other parts, a frame formed from a peripheral strip 10 and top and bottom, end cover plates 11, 12, 13 and 14. This frame structure is of a size adapted to slide into the opening provided for a negative holder in an enlarger of any conventional type. Of course, the size of the frame is dependent to some extent upon the maximum size of negative to be enlarged, or upon the other governing factors including the size of enlarger with which it is to be used, or upon the individual design characteristics of other mechanism with which it may be expected to function.

The holder is so designed as to accommodate negatives varying widely in shape and size. In fact, it can be so made as to take negatives from 35 mm. size up to 8" x 10" negatives, those being the extremes usually encountered in practical photographic work, although it would not be practical to use one enlarger for negatives of so widely differing sizes.

The negative is gripped by clamps which engage it at its corners, and these clamps are carried by side members of parallelogram mechanisms presently to be described. For convenience of description, these parallelogram mechanisms will be referred to as top and bottom parallelograms, although it is to be understood that the negative holder assembly can be used in an inverted position and the terms "top" and "bottom" are merely relative. The top parallelogram includes side bars or members 15 and 16, and end members 17 and 18. The member 17 is pivoted on a pin 19 which extends through the cover plates 13 and 14, being suitably held therein and having spacing washers for positioning the member 17 at the proper distance from plate 13, also at the proper distance from other elements retained by or guided by the pin 19. The opposite end member 18 is freely pivotable on a similar pin 20 extending through end plates 11 and 12 and having spacing members similar to those described with respect to pin 19. The side members are connected to the end members by pins or rivets upon which they are free to move so that the parallelogram may be contracted or extended as the end member 17 is swung about its pivot.

For the purpose of moving end member 17 for expanding or contracting the parallelogram, a plate 21 fixed at the end of an adjusting or actuating screw 22 connects to an extension 23 on end member 17 by a projecting pin 24 fixed within the extension 23 and extending downwardly into a slot (not shown) in the plate 21. The plate 21 is guided by a collar on pin 19, and for that purpose is slotted for a considerable distance along its length.

The bottom parallelogram comprises side members or bars 25 and 26 and end members 27 and 28. They are similarly connected at their ends for articulation and each of the end members is pivoted, one at the pin 19 and the other at the pin 20. The end member 27 has an extension 29 similar to extension 23, and a pin 30 projecting upwardly therefrom engages within a slot 31 for imparting movements to the member 27 and thereby extending or contracting that parallelogram in accordance with similar movements imparted to the top parallelogram system.

Now referring to Figs. 1 and 4, a thumb nut 32 is freely rotatable on a sleeve 33 which is internally threaded and which is also free to rotate within a bearing 34 attached at the end of the framework between cover plates 13 and 14. The screw 22 engages within the threaded interior of the sleeve 33, and since that sleeve is maintained against axial movement within bearing 34, any rotation of the sleeve will move the screw 22 and its connected plate 21 along the length of the holder. Sleeve 33 is held against possible axial movement by collars 35 and 36 clamped in position by any appropriate means, for example, the usual set screws. Thrust is taken by the washers 37 and 38 which are preferably of some material adapted to offer a minimum of frictional resistance to movement, but which preferably does not require lubrication.

The thumb nut 32 has an elongated hub portion 39 bored out to accommodate a tension spring 40 held in position by a collar 41 clamped to the end of sleeve 33. The bore within the thumb nut is enlarged at the end adjacent collar 41 and that collar retains the nut in position and also serves as an abutment against which spring 40 bears when assembled. The mechanism is assembled by slipping the nut and spring over the sleeve 33, clamping the collar 41 in position, then sliding the thumb nut and spring back to the position shown in Fig. 4, in which position it will tension the spring so that a friction washer 42 will be pressed against collar 36 when that element has been clamped in place on the sleeve. For moving the parallelograms to extend or contract them, the nut 32 is rotated in the appropriate direction and sleeve 33 will turn with that nut so long as the force required to move the parellelograms does not exceed that which may be imparted through the frictional engagement between the end of hub 39, friction washer 42 and collar 36. The tension in spring 40 and the friction between the washer 42 and its contacting elements are so proportioned as to expand the parallelograms with a force which will not pull the clamps from the negative or damage it, but will suitably tension it for retaining it in a perfectly flattened condition.

Now referring to Figs. 1, 5, 6, and 7, the clamps are generally indicated by numerals 43, 44, 45 and 46. These clamps are slidable along the side members of the parallelograms. Clamp 43 really moves with the top member 15, Fig. 1, is adjustable along that member and is held in adjusted position by a spring pressed latch which engages notches or serrations in it. Clamp 44 moves with the lower member 25 at that same side. Clamp 45 moves with the top member 16 at the opposite side and clamp 46 with the bottom member 26. The construction is such that when the members are swung or rotated in a direction to expand the parallelograms, that is, spread the side members laterally, clamps 44 and 45 move toward the right hand end of the holder, Fig. 1, and clamps 43 and 46 toward the other end. Since there is an expanding action in the parallelogram itself, there is a component of movement laterally as well as one in a longitudinal direction. The relative amounts of these components of movement vary according to the degree of expansion in the parallelograms. For smaller negatives, the lateral component will be relatively large in comparison to the longitudinal, while for larger negatives or film the longitudinal component may be somewhat greater than the lateral. However, there is always an appreciable component in both directions if the holder is employed for film of a size for which it is designed.

Figure 5:
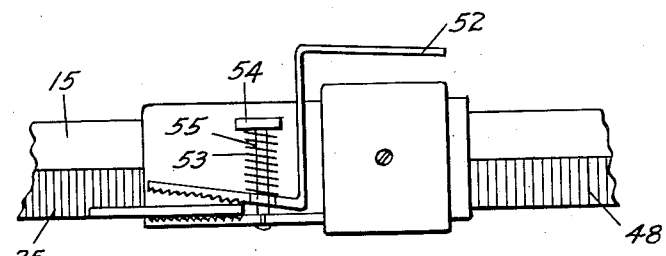
Figs. 5, 6 and 7 are detail views, greatly enlarged, showing one of the negative clamps.
Figure 6:
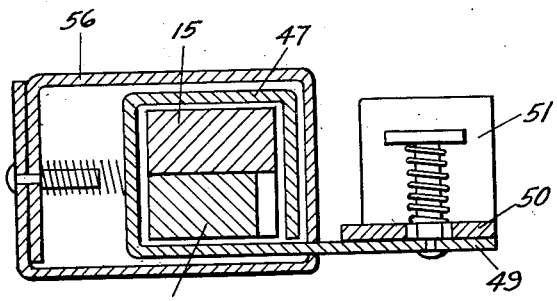
Figure 7:
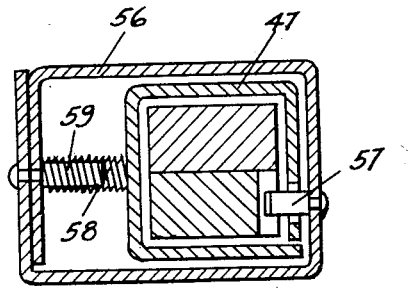

Now referring to Figs. 5, 6, and 7, one of these clamps has been illustrated in detail. It is to be understood that each clamp is actually supported by and encompasses both side members of the parallelograms although it moves with one such member while the other merely slides within it. The clamps are made up by pressing or bending thin strip stock and comprise, as a basic part, a rectangular sleeve 47 which has a relatively tight but sliding fit on the parallelogram side members such as members 15 and 25. In this particular instance, the member 25 is the one which is notched or serrated for the engagement of a spring pressed latch. Serrations are indicated at 48. At one end of the sleeve 47 and at the lower part thereof is an extension 49 which forms the lower part or jaw of the clamp itself. The upper part or jaw of that clamp is comprised of the cooperating part 50 which is knurled or otherwise provided with a frictional engaging surface at that point where it engages the film to be gripped as has also the fixed clamping element 49. The part 50 extends upwardly at 51 and then at an angle as at 52, the latter projection serving as a means for pressing or opening the clamp to introduce film between the cooperating jaws.

A spring 53 is under tension between the top of the jaw 50 and a head 54 of a rivet 55 which is retained by the lower member 49. It holds the clamp closed except as it is rocked open by pressing projection 52.

A rectangular latch holder 56 carries a latch or detent 57 engageable with the serrations. That detent or latch extends through a slot or hole in the side of the rectangular spring 47. A spring 58 held in place by an extension on a rivet 59 presses the rectangular holder 56 in a direction to keep the latch in engagement with the serrations. However, each clamp may be easily adjusted by pushing it along its supporting members and the spring 58 exerts enough tension to maintain the clamp in position for normal forces exerted in holding film in position but does not offer any great amount of resistance to movement of the clamp for adjusting it to accommodate film of different sizes. If desired, the jaws may actually have a toothed construction which will perforate the material to be held although in actual practice that has not been found essential.

In Figs. 2 and 3 the top and bottom parallelograms are shown diagrammatically by a single line construction with the directions of movement and forces indicated by arrows, some showing the forces applied to the parallelogram structure and others the resulting components of that movement imparted to the parallelograms and consequently to the clamped film or other material held. In Fig. 2 the clamp 43 exerts longitudinal and lateral components of force as indicated by that numeral. Numeral 45 likewise shows the components exerted by the clamp correspondingly numbered. In Fig. 3 the clamps 44 and 46 exert forces as indicated at the diagonally opposite points in the parallelogram mechanism.

In actual use the parallelograms are contracted to an extent necessary for easily inserting the film in the clamps. After it has been thus inserted, the parallelograms are expanded by turning the thumb nut 32 in the appropriate direction and through the frictional engagement with the friction washer 42 and collar 36, sleeve 33 is rotated to force the screw 22 and plate 21 inwardly thereby rotating the end members 17 and 27 as can be easily visualized from an inspection of Fig. 1 and the diagrammatic views in Figs. 2 and 3. The friction exerted through washer 42 is sufficient to tension the film and to maintain it in a plane, but not enough to damage it or to pull the clamps from it. So long as the negative itself is clean, the enlarged print made therefrom will show none of the effects commonly experienced due to enlargement of fingerprints, lint or particles of dirt. None of the annoying difficulties due to interference with the light rays can be experienced since those are most always produced by some peculiar action between the negative material and glass or other transparent or translucent material in close proximity to it.

Modifications will occur to those skilled in the art and the device may be varied in respects without departing from the inventive concept which has herein been described by reference to one embodiment of the same. Use of the device has been described with respect to holding negatives, film of various types, or other photographic materials, but it is to be understood that by the term "film" as herein used in the specification and claims, it is intended to include all types of flexible sheet material such as may be advantageously held and tensioned into a relatively flat condition by the mechanism as described.

The invention is defined in the appended claims.

I claim:

1. A film holder including in combination a frame, clamps for engaging the film at its corners and parallelogram means having side and end members by which the said clamps are carried, and means for expanding and contracting the said parallelogram means thereby to move each of the clamps in a direction for tensioning the film both laterally and longitudinally.

2. A film holder including in combination a frame, clamps for engaging the film at its corners and movable means for supporting said clamps, said means being variable to move each of the clamps in a direction to tension the film both laterally and longitudinally, and means operatively connected to said movable means for varying its position, said means including a slip drive.

3. A film holder including in combination a frame, a top parallelogram means and bottom parallelogram means, both of said parallelogram means being freely movable to expanded or contracted positions, film clamping means carried by said parallelogram means and movable therewith to extend the film both in a longitudinal and a lateral direction, and means operatively connected to said parallelogram means for varying their position thereby to move the said film clamping means.

4. A film holder including in combination a frame, a top parallelogram means and a bottom parallelogram means, both of said parallelogram means being freely movable to expanded or contracted positions, film clamping means carried by said parallelogram means and movable therewith to extend the film both in a longitudinal and a lateral direction, and means for moving said parallelogram means to tension a clamped film including a slip drive, whereby undue tension on the negative is avoided.

5. A film holder including in combination a frame, a parallelogram means carried by said frame including separately movable top and bottom parallelograms each comprising side and end members, clamps carried by the side members of said parallelogram means, two diagonally opposite clamps being carried by the top parallelogram means and two clamps carried by said bottom parallelogram means, a plate connected to the end members of said parallelogram means and a friction drive device for moving said plate in a manner to expand the parallelogram means and move the clamping means carried thereby so as to extend a clamped film in both a longitudinal and a lateral direction.

6. A film holder including in combination a frame, pivot means at each end of said frame, parallelograms pivoted at said last-mentioned means including a top parallelogram and a bottom parallelogram each having side and end members, clamps carried by the side members of said parallelogram means and adjustable along the length of said members so as to clamp films of different sizes, a plate pivotally connected to one set of end members of said parallelograms, a threaded screw connected to said plate and engageable within the threaded interior of a sleeve, means for retaining said sleeve against axial movement and a thumb nut rotatable on said sleeve but restrained against rotation thereon by a friction driving connection between it and the said sleeve.

7. A film holder including in combination a frame, pivot means at either end of said frame, parallelogram means including a top parallelogram and a bottom parallelogram, each having side members and end members, said end members being freely pivoted at the pivot means above mentioned, a plate pivotally connected to one set of the end members of said parallelogram means at a distance from the first-mentioned pivot means, and movable longitudinally of the frame to rotate said members thereby to expand or contract the parallelograms depending upon the direction of movement of said plate, clamping means retained by the side members of said parallelograms and adjustable long their length, a threaded screw extending from said plate and engaging within the threaded interior of a rotatable sleeve, bearing means for said sleeve restraining it against axial movement, a thumb nut rotatable on said sleeve, a friction washer providing a driving engagement between said thumb nut and said sleeve, and a tension spring exerting pressure between said thumb nut and friction washer.

8. A film holder including in combination a frame, clamps for engaging the film, means for supporting said clamps and for moving them in a direction for tensioning the film, said means including cooperating parallelograms comprising end and side members, and means for contracting and expanding said parallelogram means including a plate pivoted to each of one set of parallelogram end members and manually engageable means for moving said plate including a thumb nut, threaded means between the nut and plate and a friction driving connection between said nut and threaded means.

CARL H. JACOBSON.